(12) United States Patent
Robert Jose et al.

(10) Patent No.: US 11,972,782 B2
(45) Date of Patent: *Apr. 30, 2024

(54) SYSTEM AND METHOD FOR GENERATING PERSONALIZED VIDEO TRAILERS

(71) Applicant: Rovi Guides, Inc., San Jose, CA (US)

(72) Inventors: Jeffry Copps Robert Jose, Tamil Nadu (IN); Mithun Umesh, Karnataka (IN); Sindhuja Chonat Sri, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/591,358

(22) Filed: Feb. 2, 2022

(65) Prior Publication Data

US 2022/0157348 A1 May 19, 2022

Related U.S. Application Data

(63) Continuation of application No. 16/950,280, filed on Nov. 17, 2020, now Pat. No. 11,276,434.

(51) Int. Cl.
| | |
|---|---|
| *G11B 27/34* | (2006.01) |
| *G06F 18/214* | (2023.01) |
| *G06V 20/40* | (2022.01) |
| *G10L 25/78* | (2013.01) |
| *G11B 27/031* | (2006.01) |

(Continued)

(52) U.S. Cl.
CPC ........... *G11B 27/34* (2013.01); *G06F 18/214* (2023.01); *G06V 20/46* (2022.01); *G06V 20/49* (2022.01); *G10L 25/78* (2013.01); *G11B 27/031* (2013.01); *G11B 27/06* (2013.01); *G06V 2201/10* (2022.01); *H04N 21/2668* (2013.01); *H04N 21/8456* (2013.01); *H04N 21/8549* (2013.01)

(58) Field of Classification Search
CPC ....... G11B 27/34; G11B 27/06; G11B 27/031; G06K 9/00765; G06K 9/6256; G06K 9/00744; G06K 2209/27; G10L 25/78; H04N 21/2668; H04N 21/8456; H04N 21/8549
USPC ........................................................ 386/285
See application file for complete search history.

(56) References Cited

U.S. PATENT DOCUMENTS 10,917,721 B1 * 2/2021 Chae ...................... G06V 10/82
11,057,652 B1 7/2021 Gauny et al.
(Continued)

OTHER PUBLICATIONS

English Translation of Chinese Publication CN110347872 (Year: 2019).*

*Primary Examiner* — Loi H Tran
(74) *Attorney, Agent, or Firm* — Haley Guiliano LLP

(57) ABSTRACT

Systems and methods for generating individualized content trailers. Content such as a video is divided into segments each representing a set of common features. With reference to a set of stored user preferences, certain segments are selected as aligning with the user's interests. Each selected segment may then be assigned a label corresponding to the plot portion or element to which it belongs. A coherent trailer may then be assembled from the selected segments, ordered according to their plot elements. This allows a user to see not only segments containing subject matter that aligns with their interests, but also a set of such segments arranged to give the user an idea of the plot, and a sense of drama, increasing the likelihood of engagement with the content.

20 Claims, 11 Drawing Sheets

(51) Int. Cl.
    *G11B 27/06*     (2006.01)
    *H04N 21/2668*     (2011.01)
    *H04N 21/845*     (2011.01)
    *H04N 21/8549*     (2011.01)

(56) References Cited

U.S. PATENT DOCUMENTS

| | | | |
|---|---|---|---|
| 2016/0029106 A1* | 1/2016 | Chen | G11B 27/031 |
| | | | 386/282 |
| 2016/0342842 A1 | 11/2016 | Dunlop et al. | |
| 2018/0183739 A1 | 6/2018 | Foerster et al. | |
| 2021/0042530 A1 | 2/2021 | Kim et al. | |
| 2021/0209339 A1 | 7/2021 | You et al. | |
| 2021/0303867 A1 | 9/2021 | Vaughan | |
| 2021/0329338 A1* | 10/2021 | Khov | G06V 20/49 |

* cited by examiner

SYSTEM AND METHOD FOR GENERATING PERSONALIZED VIDEO TRAILERS

CROSS-REFERENCE TO RELATED APPLICATION(S)

This application is a continuation of U.S. patent application Ser. No. 16/950,280, filed Nov. 17, 2020, the disclosure of which is incorporated by reference herein in its entirety.

BACKGROUND

The present disclosure relates generally to video generation. More specifically, the present disclosure relates to systems and methods for generation of personalized video trailers.

SUMMARY

In one approach content delivery systems may utilize stored user preferences to identify and deliver to users personalized content tailored to their individual interests. However, this approach may have deficiencies. While identified content may align with a user's interests, such users often decide whether to watch this content by first viewing its trailer. Content trailers are typically not generated on an individual basis though, and thus may not feature any content portions that the user is interested in. Accordingly, even though systems may identify content of interest to users, such users may still fail to view this content, mistakenly believing it does not contain any material of interest simply because its one-size-fits-all trailer omits those portions of content.

To overcome the limited ability of computer based content delivery systems to engage users with personalized content, systems and methods are described herein for a computer-based process that automatically generates individualized content trailers tailored to each user's interests. This allows users to more quickly perceive that the content in question is of interest to them, improving engagement and likelihood of viewing.

In some embodiments of the disclosure, content such as a video is divided into segments (e.g., time segments) each representing a set of common features. With reference to a set of stored user preferences, certain segments are selected as aligning with the user's interests. Each selected segment may then be analyzed to determine to which plot element it belongs. For example, segments may be analyzed to determine whether they represent a plot introduction, a plot transition, a complication, or a conclusion of the plot. A coherent trailer may then be assembled from the selected segments, according to the plot elements they represent. For instance, a trailer may begin with a plot introduction segment, followed by a transition segment, followed by a segment showing a plot complication. This allows a user to see not only segments containing subject matter that aligns with their interests, but also a set of such segments arranged to give the user an idea of the plot, and a sense of drama, increasing the likelihood of engagement with the content.

In some embodiments of the disclosure, content may be segmented as above, and a subset of these segments may be identified based on segment metadata that matches a user profile. The assigning of metadata to each segment may be carried out using a machine learning model, such as a convolutional neural network or generative adversarial network, trained to assign metadata elements to a segment. In some embodiments, segment metadata may list attributes such as actors or objects appearing in that segment, with segments selected according to actors/objects that match corresponding entries in a user profile. A trailer element label may then be assigned to each such identified segment, with the trailer element label representing a particular plot element to which the segment likely belongs. The assigning of labels may be carried out using a machine learning model, such as a convolutional neural network or generative adversarial network, trained to identify plot elements of a segment. The model may be trained on a training set made up of segments and associated metadata containing corresponding trailer element labels, i.e., labeled content segments.

Once identified segments are labeled, they may then be arranged in order of their assigned trailer element labels, to generate a coherent trailer of media content for user viewing. This trailer may then be transmitted for display to the user, such as by transmission to a display device that is associated with the user's profile. For example, the user interface may present an option to a user to view a trailer when the user selects an identifier of the media content (e.g., on an EPG or on streaming platform interface). As above, segments may be arranged generally in order of typical plot element progression in content. For example, the assembled trailer may begin with an introduction segment, followed by a transition segment, one or more plot complication segments, and a conclusion segment. While any number and order of segments and plot elements is contemplated, embodiments of the disclosure contemplate arrangement in one or more sequences describing content plot progression.

The identification of plot elements for segments may be performed in any suitable manner. In some embodiments of the disclosure, plot elements may be identified by spoken phrases within segments. In particular, one or more audible phrases may be identified within a segment such as a video segment, as well as corresponding time index during which the phrase occurred within the segment or within the content. The corresponding plot element may then be determined from this data. For example, phrases signaling beginnings, such as "a long time ago" occurring early within content, may indicate that the segment is part of the plot's introduction. Plot element determination may be carried out via a machine learning model that takes as input the identified phrases and times, and generates as output the plot element label. Each plot element label may then be associated with its corresponding segment, such as by including it within segment metadata.

In some embodiments of the disclosure, plot elements may also be identified by objects or individuals appearing within segments. As with audible phrases, objects appearing at certain points in time may indicate a particular plot element. For example, individuals having metadata labels as villains appearing within the middle of content may be indicative of a plot complication. Plot element determination may be carried out via a machine learning model that takes as input the identified objects and times, and generates as output the plot element label. Each plot element label may then be associated with its corresponding segment, such as by including it within segment metadata.

Arranging of video segments may also be performed by reference to existing content trailers. That is, an existing trailer may be retrieved and analyzed to determine the order of plot elements in its segments, and a new personalized trailer may be assembled from segments having the same order of plot elements. In other words, embodiments of the disclosure may generate new trailers by repeating the plot element order of existing trailers.

Embodiments of the disclosure also contemplate selection of audio tracks to accompany generated custom trailers. As one example, the duration of generated custom trailers may be determined, and audio tracks, or portions thereof, corresponding to this duration may be selected.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for generating individualized content trailers. Content such as a video is divided into segments each representing a set of common features. With reference to a set of stored user preferences, certain segments are selected as aligning with the user's interests. Each selected segment may then be assigned a label corresponding to the plot portion or element to which it belongs. A coherent trailer may then be assembled from the selected segments, ordered according to their plot elements. For instance, a trailer may begin with a plot introduction segment, followed by a transition segment, followed by a segment showing a plot complication. This allows a user to see not only segments containing subject matter that aligns with their interests, but also a set of such segments arranged to give the user an idea of the plot and a sense of drama, increasing the likelihood of engagement with the content.

Figure 1A:
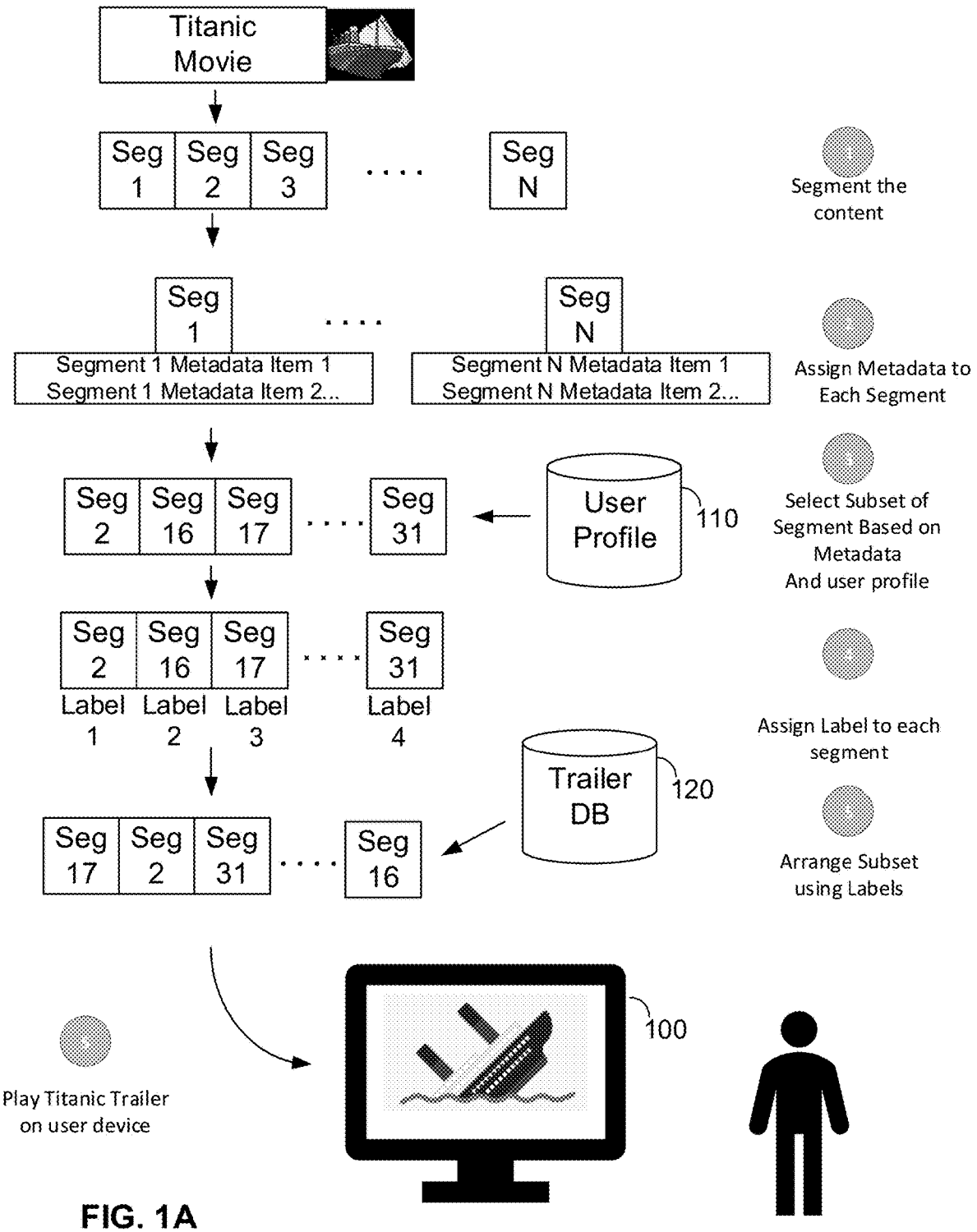
FIG. 1A conceptually illustrates operation of an exemplary system for generating personalized video trailers, in accordance with embodiments of the disclosure.

FIG. 1A conceptually illustrates operation of an exemplary system for generating personalized video trailers, in accordance with embodiments of the disclosure. In this example, a movie such as Titanic may be selected as being content of interest to a particular user. A program such as a trailer generation application may then assemble a personalized trailer for presentation to the user on display 100, to improve the likelihood that the user chooses to view Titanic. Accordingly, as shown in Step 1, the trailer generation application first divides the movie into N segments, where N may be any number. Segments may be selected according to common features displayed, for example according to techniques further described in, e.g., FIG. 6A below. That is, segments are chosen according to features identified therein, with changing features indicating the end of one segment and the beginning of another. Thus, for example, a particular scene featuring two actors in a car may have one segment in which both actors appear, with a new segment beginning when one actor steps out of the car, when the car starts or stops (i.e., engine noise begins or ends), conversation between the actors begins or ends, or the like. Embodiments of the disclosure contemplate determination of a new segment when any identified features change their state in any manner.

As shown in Step 2, features identified in each segment at Step 1 are then appended to those segments as metadata. In this manner, each segment carries with it a list of the features it contains, such as actors and objects that appear therein.

At Step 3, the trailer generation application selects segments for use in a custom trailer. More specifically, the application retrieves user preferences from a user profile database 110, and uses these preferences to select segments expected to appeal to the user. The selection of content items according to preferences of user profiles is known, and embodiments of the disclosure contemplate use of any such approach, to select any content. As one example, segments may be selected via comparison of their metadata to the profile retrieved from database 110. In this example, segments may be selected if their metadata lists one or more actors or actresses that also appear as preferences of the retrieved user profile. Segments may also be selected if their metadata lists one or more objects, such as vehicles, weapons, or consumer products, in common with user preferences. Alternatively, segments may be selected if their metadata lists other attributes in common with user preferences, such as a genre, events such as gunfire, desired audio, or the like. Any criteria for selecting segments according to any similarity between user preferences and segment metadata are contemplated.

Next, the trailer generation application assigns a label to each selected segment, as shown in Step 4. Labels may correspond to plot points or plot elements, i.e., stages of plot development. For example, plot elements of a typical movie may include an introduction stage, one or more transition stages in which plot developments are introduced, one or more plot complications introducing obstacles or difficulties for one or more characters, and a conclusion or resolution. A plot element may be determined for each segment selected in Step 3, and assigned to its segment as, e.g., a metadata label. Plot element determination methods are described further below, but embodiments of the disclosure contemplate any method or process for determining the plot stage or element of a content segment.

The trailer generation application may then assemble the selected and labeled segments into a trailer, as shown in Step 5. In particular, a template progression of plot elements (e.g., introduction, transition, complication, transition, complication) may be determined in any manner, and a segment may be picked for each plot element of the template, according to segment labels. In the example of FIG. 1A, the trailer of Step 5 may employ a template comprising an introduction, a transition, and a complication, followed by a number of other plot elements, and ending with a complication to leave the plot unresolved and add to user tension. Segment 17 may be labeled as an introduction and thus selected as the first segment of the trailer, followed by segments 2 and 31 which have transition and complication labels, respectively. The trailer may conclude with segment 16, which has been labeled as a complication segment. Thus, trailers may be assembled using a template order of plot elements, with segments selected for each element of the order, according to their plot element labels.

As shown in Step 6, the trailer generation application may then transmit the Titanic trailer assembled in Step 5 for display to the user via display 100. In this manner, a custom trailer may be assembled and offered to the user, where this trailer has been generated individually to meet that user's preferences.

Figure 1B:
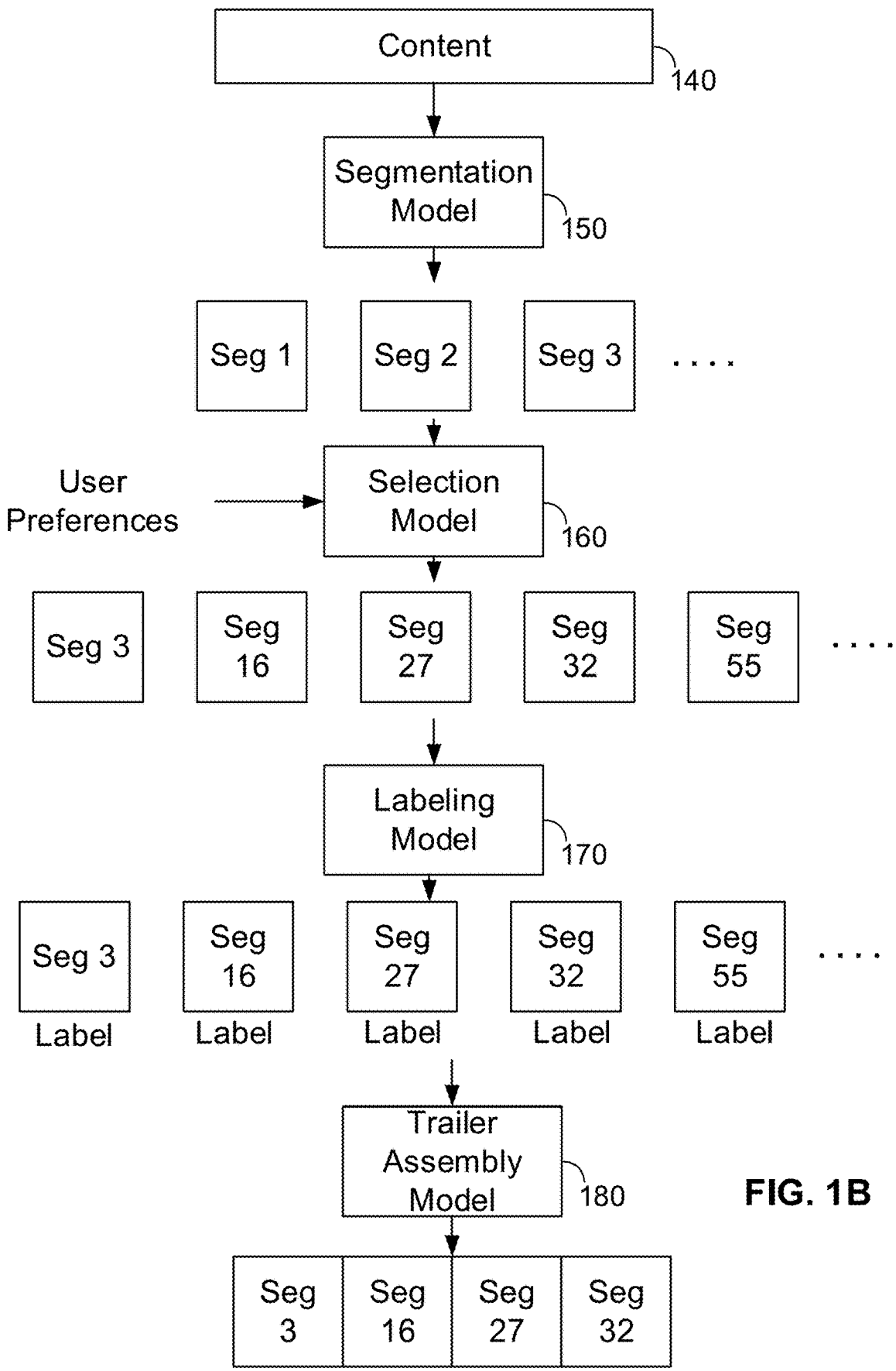
FIG. 1B conceptually illustrates further details of operation of an exemplary system for generating personalized video trailers, in accordance with embodiments of the disclosure.

FIG. 1B conceptually illustrates further details of operation of an exemplary system for generating personalized video trailers, in accordance with embodiments of the disclosure. Here, content 140, such as the movie Titanic in the example of FIG. 1A, is input to a segmentation model 150 which divides content 140 into a series of segments Seg 1, Seg 2, Seg 3, and so on. As above, segmentation model 150 divides content 140 into segments representing portions each containing a particular set of attributes, such as a particular set of actors, objects, settings, events, sights, sounds, or the like. Changes in these attributes may signal the end of one segment and the beginning of the next.

Segmentation model 150 may be, for example, any set of computer-implemented instructions for dividing content 140 into segments Seg n. In some embodiments of the disclosure, segmentation model 150 may be a set of instructions implementing one or more machine learning models. These models may include a model such as a convolutional neural network model trained to segment input content. More specifically, a convolutional neural network model may be configured to receive a content stream as input, and to output likelihoods of a segment boundary, i.e., the end of one segment and the beginning of another. The model may thus be trained using training sets containing content streams with labeled segment transition points.

In particular, the model may also be trained to identify attributes such as people and objects within input content, as well as voices and sounds. This may be accomplished in known manner, using convolutional neural networks trained using training sets including content streams labeled with the identities of the various attributes employed, e.g., people, objects, voices, sounds, and the like. From the labeled segment transition points, the model learns to associate segment transitions with changes in attribute states, such as the appearance/disappearance of people or objects in a scene, changes in voices and sounds, and the like. Identified attributes may be associated with each identified segment as metadata.

A selection model 160 then retrieves user preferences to select segments estimated to be of interest to that particular user. Selection model 160 may be, for example, any set of computer-implemented instructions for selecting segments from among the segments Seg n. In some embodiments of the disclosure, selection model 160 may be a set of instructions implementing a routine that retrieves user preferences from, e.g., a user profile database 110, and compares these preferences to metadata of each segment Seg n. Selection model 160 may select segments that are sufficiently similar to the retrieved set of user preferences. Selection may be rule based, with embodiments of the disclosure contemplating use of any rules or criteria. That is, any rules or criteria for determining whether segment metadata bears sufficient similarity to retrieved user preferences may be employed. For example, selection model 160 may select segments from among Seg n if segment metadata includes two or more attributes in common with the retrieved list of user preferences. Any number of common attributes may be employed as selection criteria, however. Alternatively, any other criteria may be employed. For instance, certain attributes may be deemed or flagged as more important than others, such that matches between any one of these attributes may result in segment selection.

Once segments are selected, labeling model 170 may label each selected segment with a corresponding plot element label. Labeling model 170 may be, for example, any set of computer-implemented instructions for determining plot elements of content segments. In some embodiments of the disclosure, labeling model 170 may be a set of instructions implementing one or more machine learning models. These models may include a model such as a convolutional neural network model trained to determine plot elements of content segments. More specifically, a convolutional neural network model may be configured to receive input content segments and associated metadata attributes such as those determined and appended by segmentation model 150. The model may then output likelihoods of predetermined plot elements, such as the abovementioned introduction, transition, complication, and conclusion, although any set of plot elements may be employed. The model may thus be trained using training sets containing content segments and their attribute metadata, where the segments are labeled with their corresponding plot element. Output plot element designations may then be added to segment metadata.

Segments labeled with their plot elements may then be input to trailer assembly model 180 for assembly into a trailer. As above, trailer assembly model 180 may store or retrieve a predetermined template sequence of plot elements deemed to be desirable to users, and may select input segments to match this plot element sequence. Thus, for example, if the trailer assembly model 180 stores a template sequence such as (introduction, transition, complication, transition, complication), model 180 would first select an input segment labeled as being an introduction plot element, followed by a segment labeled as being a transition plot element, then a segment labeled as being a complication plot element, then another segment labeled as a transition, followed last by another segment labeled as a complication. These segments would then be concatenated in order, to form a trailer. Alternatively, some embodiments of the disclosure contemplate a trailer assembly model 180 programmed to retrieve a preexisting trailer and to select input segments that follow the plot sequence of the retrieved trailer.

Once the trailer is assembled, it may then be transmitted for display to the user. As the trailer is made up of segments containing elements the user prefers, and has been assembled in an order deemed to be desirable, the trailer has increased likelihood of generating user engagement with the corresponding content.

Figure 2:
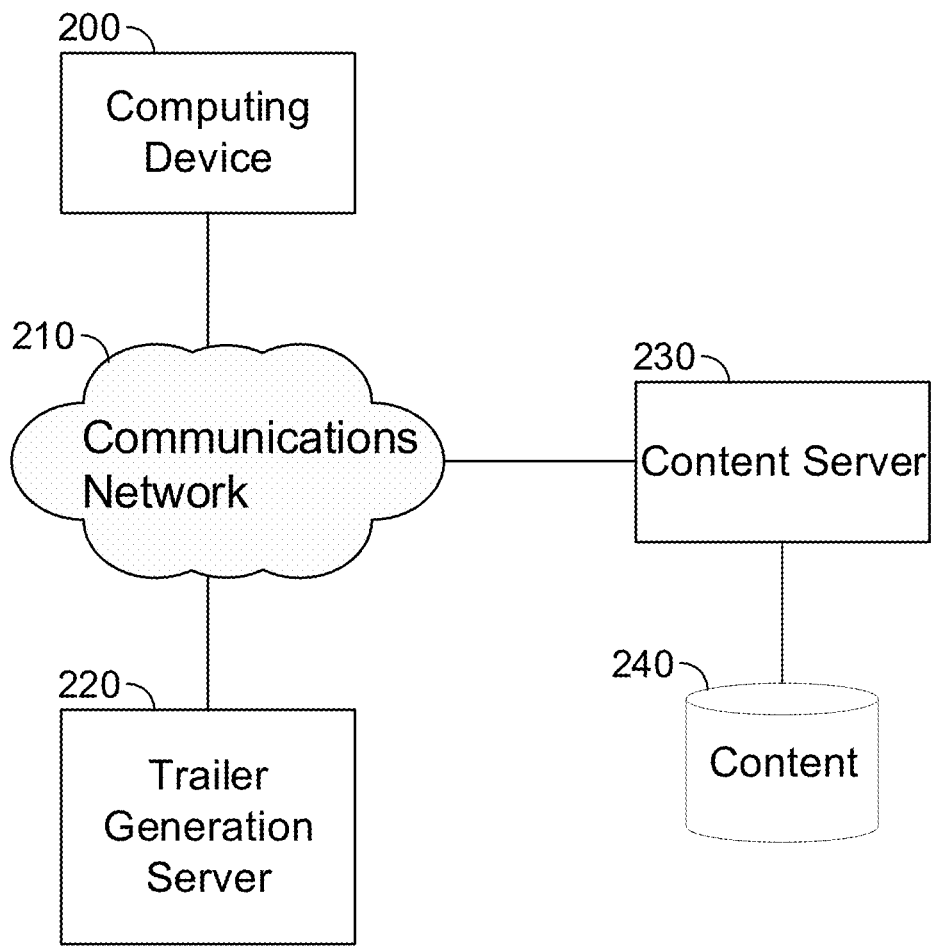
FIG. 2 is a block diagram illustration of a system for generating personalized video trailers, in accordance with embodiments of the disclosure.

FIG. 2 is a block diagram illustration of a system for generating personalized video trailers, in accordance with embodiments of the disclosure. A computing device 200 may be in communication with an ASR server 220 through, for example, a communications network 210. ASR server 220 is also in electronic communication with content search server 230 also through, for example, the communications network 210. Computing device 200 may be any computing device running a user interface, such as a voice assistant, voice interface allowing for voice-based communication with a user, or an electronic content display system for a user. Examples of such computing devices are a smart home assistant similar to a Google Home® device or an Amazon® Alexa® or Echo® device, a smartphone or laptop computer with a voice interface application for receiving and broadcasting information in voice format, a set-top box or television running a media guide program or other content display program for a user, or a server executing a content display application for generating content for display or broadcast to a user. trailer generation server 220 may be any server running a trailer generation application, including modules for implementing processes of embodiments of the disclosure. Content server 230 may be any server programmed to search for electronic content responsive to queries processed by the trailer generation server 220. For example, content server 230 may be a server programmed to search content database 240 for content, and to return selected content or representations thereof to one or more of trailer generation server 220 or computing device 200.

The computing device 200 may be any device capable of acting as a display system for content provided by trailer generation server 220. For example, computing device 200 may be a voice assistant, smart home assistant, digital TV running a content display interface, laptop computer, smartphone, tablet computer, or the like.

Figure 3:
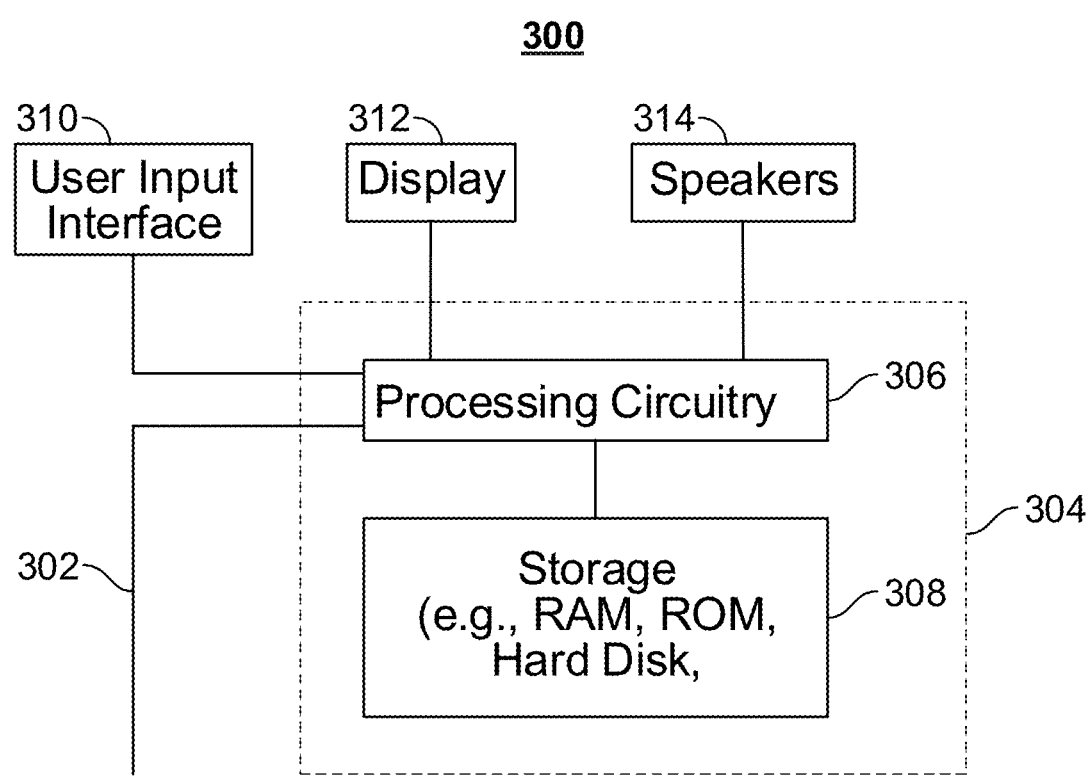
FIG. 3 is a generalized embodiment of illustrative electronic computing devices constructed for use according to embodiments of the disclosure.

FIG. 3 shows a generalized embodiment of an illustrative user equipment device 300 that may serve as a computing device 200. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers to stream and display content on display 312.

Control circuitry 304 may thus include communications circuitry suitable for communicating with trailer generation server 220, content server 230, or any other networks or servers. Communications circuitry may include a cable modem, an integrated services digital network (ISDN) modem, a digital subscriber line (DSL) modem, a telephone modem, an Ethernet card, or a wireless modem for communication with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308, which is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Storage 308 may also store instructions or code for an operating system and any number of application programs to be executed by the operating system. In operation, processing circuitry 306 retrieves and executes the instructions stored in storage 308, to run both the operating system and any application programs started by the user. The application programs can include one or more content display applications that implement an interface allowing users to select and display content on display 312 or another display, and that may inform the trailer generation server 220 of the identity of a user, for retrieval of a corresponding user profile or preferences.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content.

The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch-screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
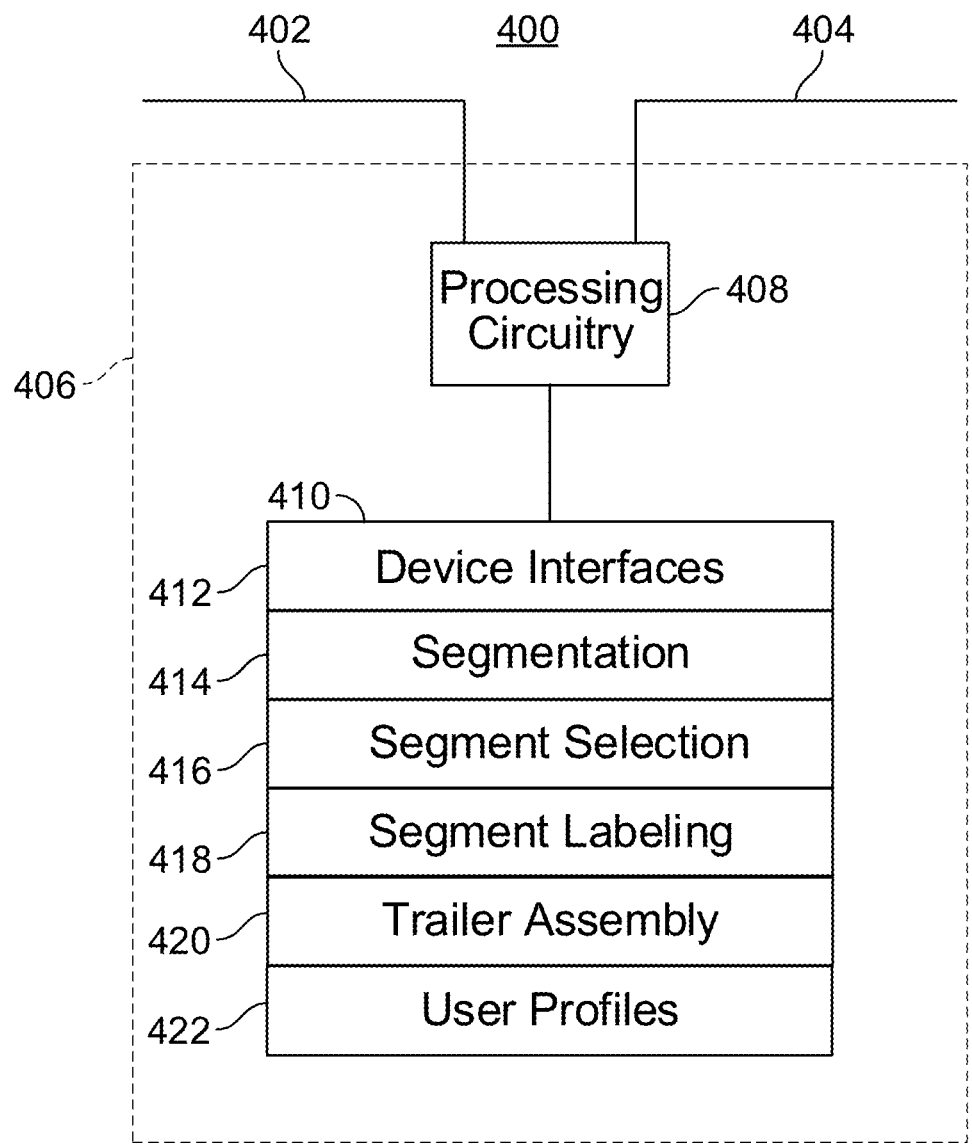
FIG. 4 is a generalized embodiment of an illustrative trailer generation server constructed for use according to embodiments of the disclosure.

FIG. 4 is a generalized embodiment of an illustrative trailer generation server 220 constructed for use according to embodiments of the disclosure. Here, device 400 may serve as a trailer generation server. Device 400 may receive content and data via I/O paths 402 and 404. I/O path 402 may provide content and data to the various devices 200, 230, while I/O path 404 may provide data to, and receive content from, one or more content search servers 230. Like the user equipment device 300, the device 400 has control circuitry 406, which includes processing circuitry 408 and storage 410. The control circuitry 406, processing circuitry 408, and storage 410 may be constructed, and may operate, in a similar manner to the respective components of user equipment device 300.

Storage 410 is a memory that stores a number of programs for execution by processing circuitry 408. In particular, storage 410 may store a number of device interfaces 412, as well as modules of the above described trailer generation application. The trailer generation application may include a segmentation module 414, a segment selection module 416 for selecting segments generated by segmentation module 414, a segment labeling module 418 for labeling selected segments with corresponding plot element labels, a trailer assembly module 420 for assembling a trailer from labeled segments, and user profiles 422 for use by segment selection module 416 in selecting segments that users may be interested in. The device interfaces 412 are interface programs for handling the exchange of commands and data with the various devices 200. Segmentation module 414 is one or more programs for carrying out the content segmentation functions described herein, e.g., dividing input content into segments that may be selected and assembled into a trailer. Segment selection module 416 includes code for executing all of the above described functions for selecting segments, including retrieving user profiles 422, comparing metadata of received content segments to the user profiles 422, and selecting segments based on this comparison. Segment labeling module 418 is a module for performing the above-described segment labeling processes, and appending plot element labels to segments as, e.g., metadata labels. Trailer assembly module 420 includes code for executing assembly of trailers from selected labeled segments, including in some embodiments code for retrieving existing content trailers, determining their plot element sequences (perhaps by passing them through, in order, segmentation module 414, segment selection module 416, and segment labeling module 418), and generating trailers by selecting labeled segments in the same plot element sequences.

The device 400 may be any electronic device capable of electronic communication with other devices and performance of personalized trailer generation processes described herein. For example, the device 400 may be a server, or a networked in-home smart device connected to a home modem and thereby to various devices 200. The device 400 may alternatively be a laptop computer or desktop computer configured as above.

Figure 5:
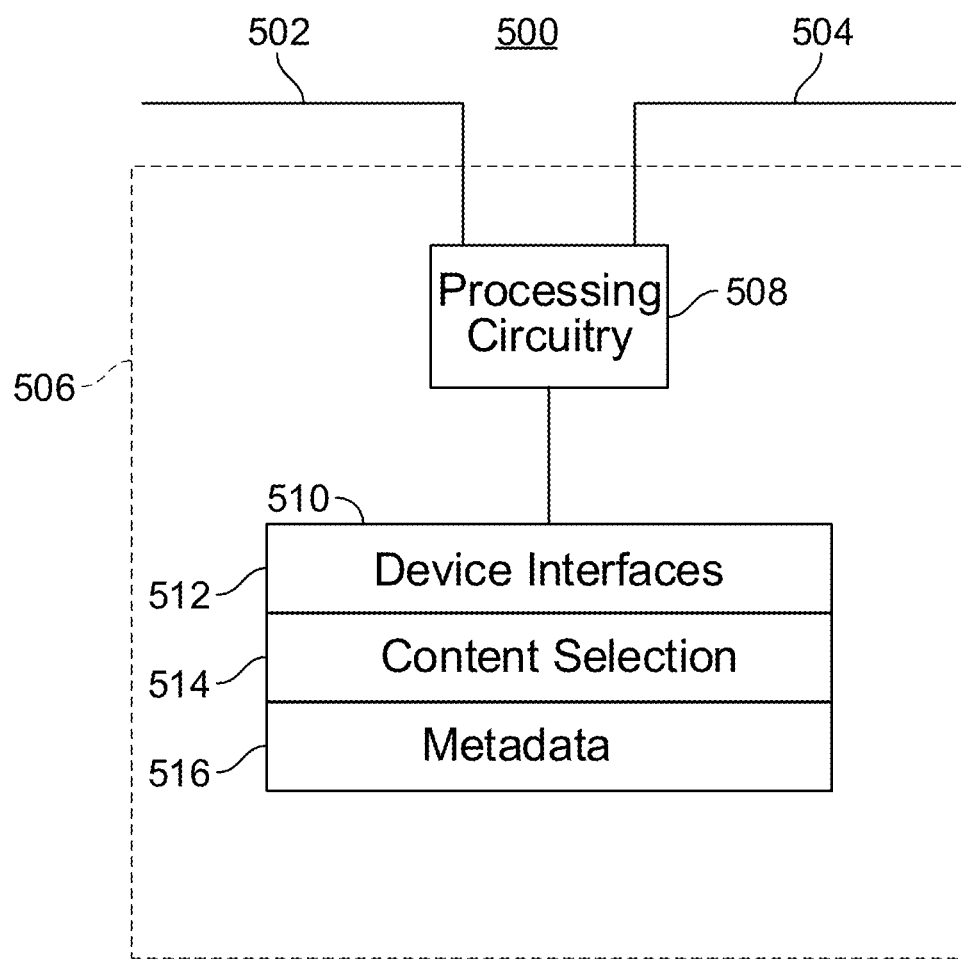
FIG. 5 is a generalized embodiment of an illustrative content server constructed for use according to embodiments of the disclosure.

FIG. 5 is a generalized embodiment of an illustrative content server 230 constructed for use according to embodiments of the disclosure. Here, device 500 may serve as a content server. Device 500 may receive content and data via I/O paths 502 and 504. I/O path 502 may provide content and data to the various devices 200 and/or server 220, while I/O path 504 may provide data to, and receive content from, content database 240. Like the device 400, the device 500 has control circuitry 506, which includes processing circuitry 508 and storage 510. The control circuitry 506, processing circuitry 508, and storage 510 may be constructed, and may operate, in a similar manner to the respective components of device 400.

Storage 510 is a memory that stores a number of programs for execution by processing circuitry 508. In particular, storage 510 may store a number of device interfaces 512, a content selection module 514 for searching electronic content entries stored in content database 240 according to requests from trailer generation server 220, and metadata generation module 516 for generating and appending metadata to content. The device interfaces 512 are interface programs for handling the exchange of commands and data with the various devices 200. Content selection module 514 includes code for searching for and retrieving electronic content. Metadata generation module 518 is configured to append data from trailer generation server 220 as metadata to content, responsive to instructions from the trailer generation server 220.

Any of the various modules and functions of servers 220 and 230 may reside on any one or more devices. For example, metadata generation and appending functionality may reside on trailer generation server 220. Any trailer generation functions may reside on any other server, or even within computing device 200.

Figure 6A:
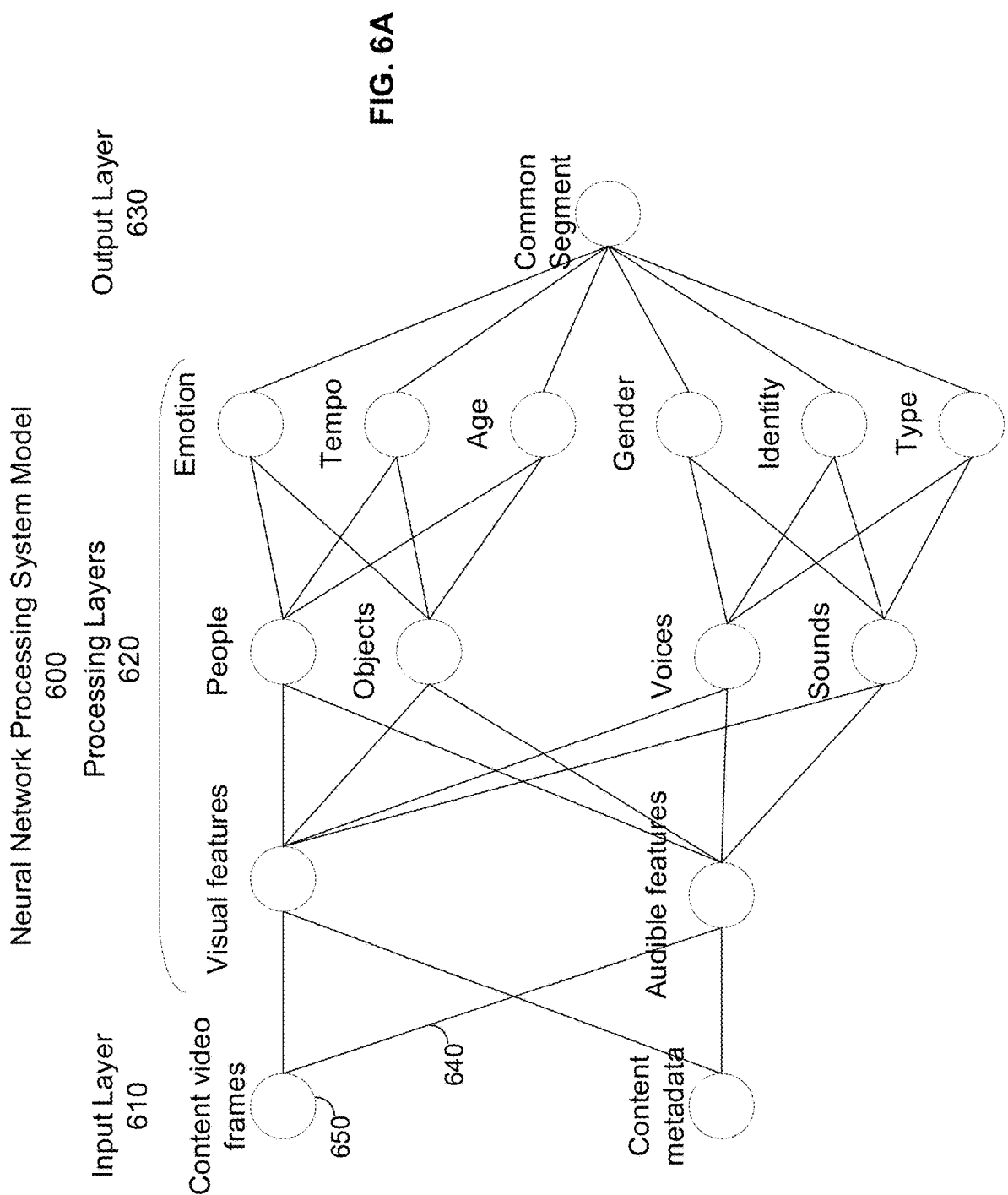
FIG. 6A conceptually illustrates an exemplary neural network for performing segmentation of content, in accordance with embodiments of the disclosure.

FIG. 6A conceptually illustrates an exemplary neural network for performing segmentation of content, in accordance with embodiments of the disclosure. As above, segmentation model 150 divides content 140 into segments Seg n. Segmentation model 150 may be any set of instructions for dividing up content into constituent segments. In some embodiments of the disclosure, segmentation model 150 may include instructions for implementing a machine learning model trained to divide input content into segments. As one example, segmentation model 150 may include instructions for implementing a convolutional neural network, although any suitable neural network or other machine learning model or construct may be employed.

FIG. 6A shows an illustrative diagram of a neural network model node array 600 according to some embodiments of the disclosure. An input layer 610 may include various input nodes 650 matched to particular profile attributes (e.g., video content and its associated metadata). The input nodes may also include inputs to various image data, content structures, and content data. These input nodes may be connected, designated by varying degrees of connection strength 640, to other nodes within a processing layer 620 of nodes. The processing layer 620 of nodes directs the neural network to identify attributes of the input video content based upon connections to the input layer and to other nodes within the processing layer 620. Attributes may be any desired properties of the input content, such as people or objects (as determined from visual features determined by, e.g., kernel layers), as well as voices or sounds (as determined from audible features such as extracted frequencies, tones, etc.). Attributes such as emotion, tempo, and age may in turn be determined from these identified people and objects. Similarly, attributes such as gender, identity, and voice/sound type may be determined from identified voices and sounds. While FIG. 6A shows attributes of voices and sounds, followed by gender, identity, and type, although any suitable attributes capable of being determined from video and metadata may be employed. Table 1 lists exemplary attributes that may be determined from audible or audio features, in one embodiment of the disclosure.

Table 1: Exemplary Audio Attributes Extracted by Processing Layers

Is voice (binary)
    Emotion (e.g., integer level)
    Age (group(s))
    Gender
    Speaker state (integer level)
    Tempo (range)
    Action type (e.g., dance style, singing type, etc.)
    Genre (e.g., integer level)

Table 2 lists exemplary attributes that may be determined from video or visual features, in one embodiment of the disclosure.

Table 2: Exemplary Visual Attributes Extracted by Processing Layers

Person type
        Male youth
        Female youth
        Male adult
        Female adult
    Emotion (expressed in numerical level)
        Sadness
        Surprise
        Amazement
        Boredom
        Joy
        Annoyance Any attributes or classifications may be determined, in any quantities. For example, Table 2 illustrates an exemplary set of processing layers 620 configured to determine the type (e.g., male/female, youth/adult) of identified persons, and emotions they may be expressing (e.g., sadness, surprise, amazement, etc., although any emotions may be determined). The processing layer processes the input depending on the current state of the network's adaptive programming. The processing layer may have direct access to an image/content structure data store (e.g., data/content storage 240 of FIG. 2) from which content may be retrieved. Model node array 600 may be used within a neural network generator module such as segmentation module 414 of FIG. 4.

Based upon the processing in the processing layer 620, an output segment is generated through the output layer 630, triggered by events such as a change in any of the determined attributes in the rightmost processing layer 620 of FIG. 6A. The output layer 630 produces an output segment designation from the various attributes determined through the input and processing layers 610 and 620. The output depiction may be further forwarded to a segment selection module 414 and/or distributed such as further described herein. After a segment is forwarded to segment selection module 414 and/or distributed, the neural network may be (re-)programmed based upon feedback received in response. For example, feedback data may indicate a greater relative positive response (e.g., consumption of content) from particular profile types to particular segments. The neural network may thus be reprogrammed to strengthen a connection (association) between a particular profile and image/content structure attribute.

Figure 6B:
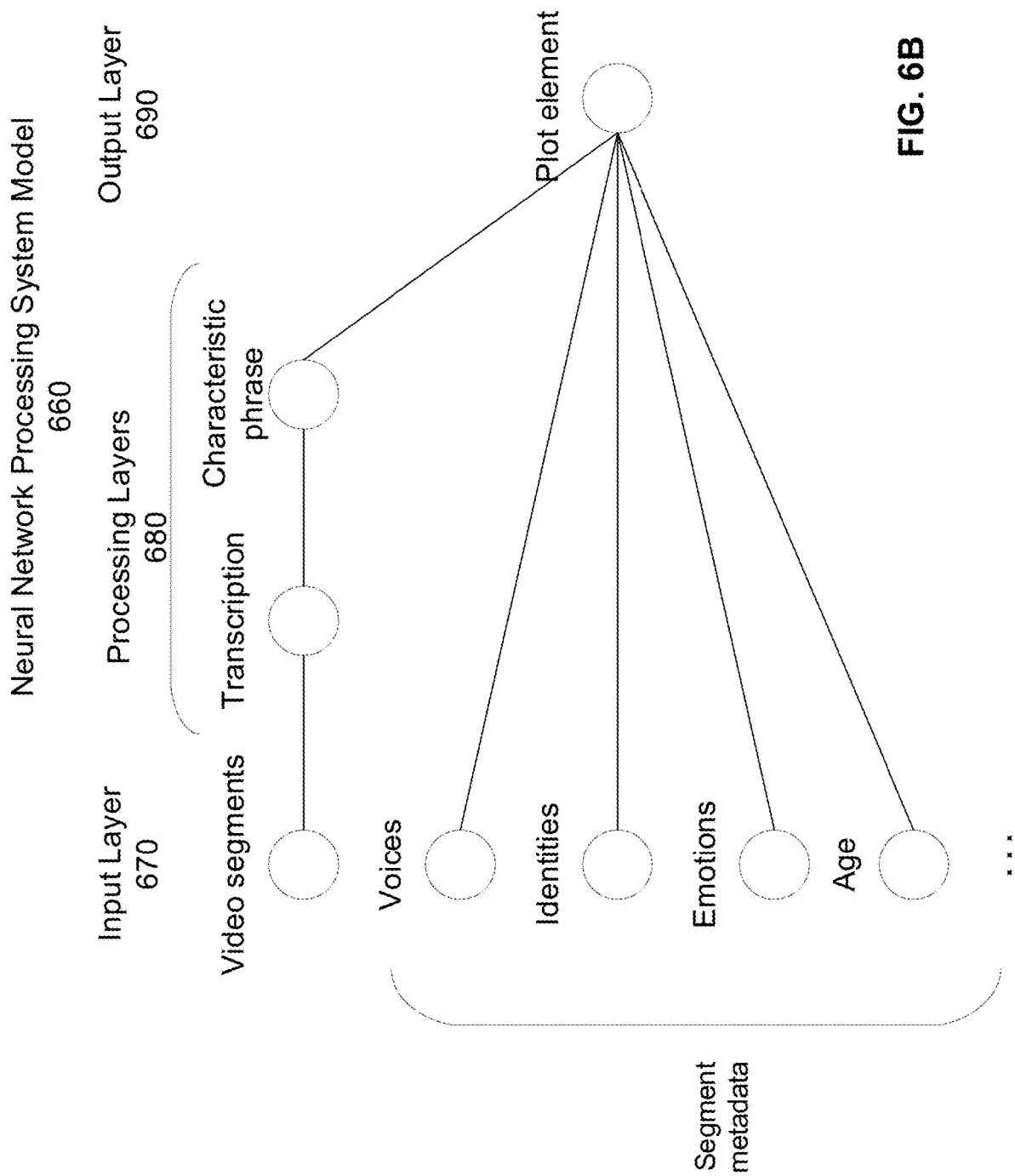
FIG. 6B conceptually illustrates an exemplary neural network for performing plot element labeling of content segments, in accordance with embodiments of the disclosure.

FIG. 6B conceptually illustrates an exemplary neural network for performing plot element labeling of content segments, in accordance with embodiments of the disclosure. As above, segment labeling model 170 labels input content segments with their corresponding plot element. Labeling model 170 may be any set of instructions for identifying plot elements of segments, and labeling those segments accordingly. In some embodiments of the disclosure, labeling model 170 may include instructions for implementing a machine learning model trained to divide input content into segments. As one example, labeling model 170 may include instructions for implementing a convolutional neural network, although any suitable neural network or other machine learning model or construct may be employed.

FIG. 6B shows an illustrative diagram of a neural network model node array 600 according to some embodiments of the disclosure. An input layer 670 may include various input nodes matched to particular profile attributes, e.g., video content segments and their associated attributes as determined from model 600 of FIG. 6A, including segment voices, object and/or person identities, emotions, ages, and the like. These input nodes may be connected, designated by varying degrees of connection strength, to other nodes within a processing layer 680 of nodes. The processing layer 680 of nodes directs the neural network to identify attributes of the input video content based upon connections to the input layer and to other nodes within the processing layer 620. Attributes may be any desired properties of the input content, such as a voice transcription, followed by identification of characteristic phrases, i.e., any predetermined phrases that may indicate a plot element. The processing layer processes the input depending on the current state of the network's adaptive programming. The processing layer may have direct access to an image/content structure data store (e.g., data/content storage 240 of FIG. 2) from which content may be retrieved. Model node array 680 may be used within a neural network generator module such as segment labeling module 418 of FIG. 4.

Based upon the processing in the processing layer 680, a plot element is determined according to attributes of both input layer 670 and processing layers 680. That is, the output layer 690 produces a plot element designation from the various attributes determined through the input and processing layers 670 and 680. The output plot element may be further forwarded to a trailer assembly module 420 and/or distributed such as further described herein. After a segment is forwarded to trailer assembly module 420 and/or perhaps distributed, the neural network may be (re-)programmed based upon feedback received in response. For example, feedback data may indicate a greater relative positive response (e.g., consumption of content) from particular plot elements. The neural network may thus be reprogrammed to strengthen a connection (association) between a particular plot element and image/content structure attribute.

Figure 7:
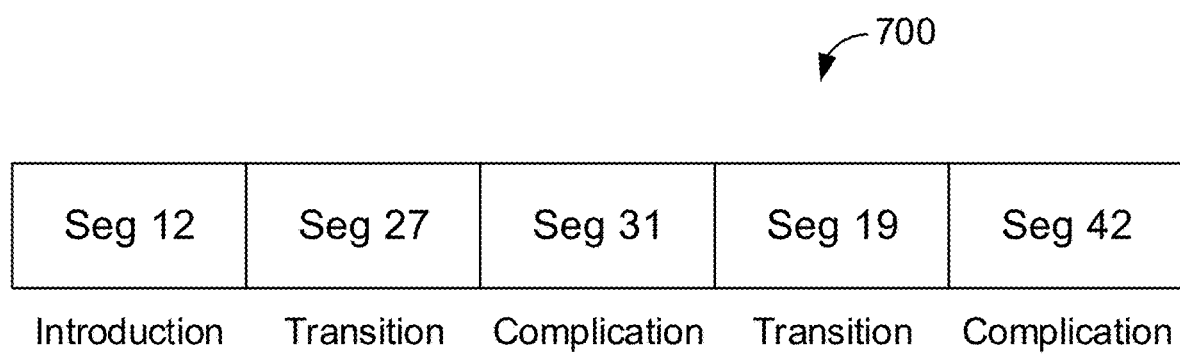
FIG. 7 conceptually illustrates organization of an exemplary personalized trailer, constructed in accordance with embodiments of the disclosure.

FIG. 7 conceptually illustrates organization of an exemplary personalized trailer, constructed in accordance with embodiments of the disclosure. As above, trailer assembly module 420 may assemble trailers in any manner, one such example being assembly according to a predetermined template. This template may be predetermined, or may be determined from a trailer retrieved from content database 240. Retrieved trailers may be trailers having predetermined segments labeled according to their plot element, or retrieved trailers may be subjected to the above described processes of the disclosure, in which the trailers are segmented by segmentation module 414 and plot element labels are determined by segment labeling module 418. The plot element sequence of a retrieved trailer may then be employed as a template for construction of a new personalized trailer.

In FIG. 7, trailer assembly module 420 may store the exemplary trailer template (introduction, transition, complication, transition, complication) as shown, although any template containing any order of plot elements is contemplated. Module 420 may thus select segments having corresponding labels, and assemble the segments in the template order. Here, for example, labeled segments may be passed to module 420, which may select Seg 12 which is labeled as an introduction segment, followed by Seg 27 which is labeled as a transition segment, Seg 31 which is labeled as a complication segment, Seg 19 which is labeled as a transition segment, and Seg 42 which is labeled as a complication segment. These segments are then appended in the plot element order specified by the template, to generate a trailer as shown. Templates may have any order of plot elements, including any number and type of repeated sequences of plot elements. For example, the trailer of FIG. 7 is constructed according to a template that concludes with a repeated transition-complication sequence.

Figure 8:
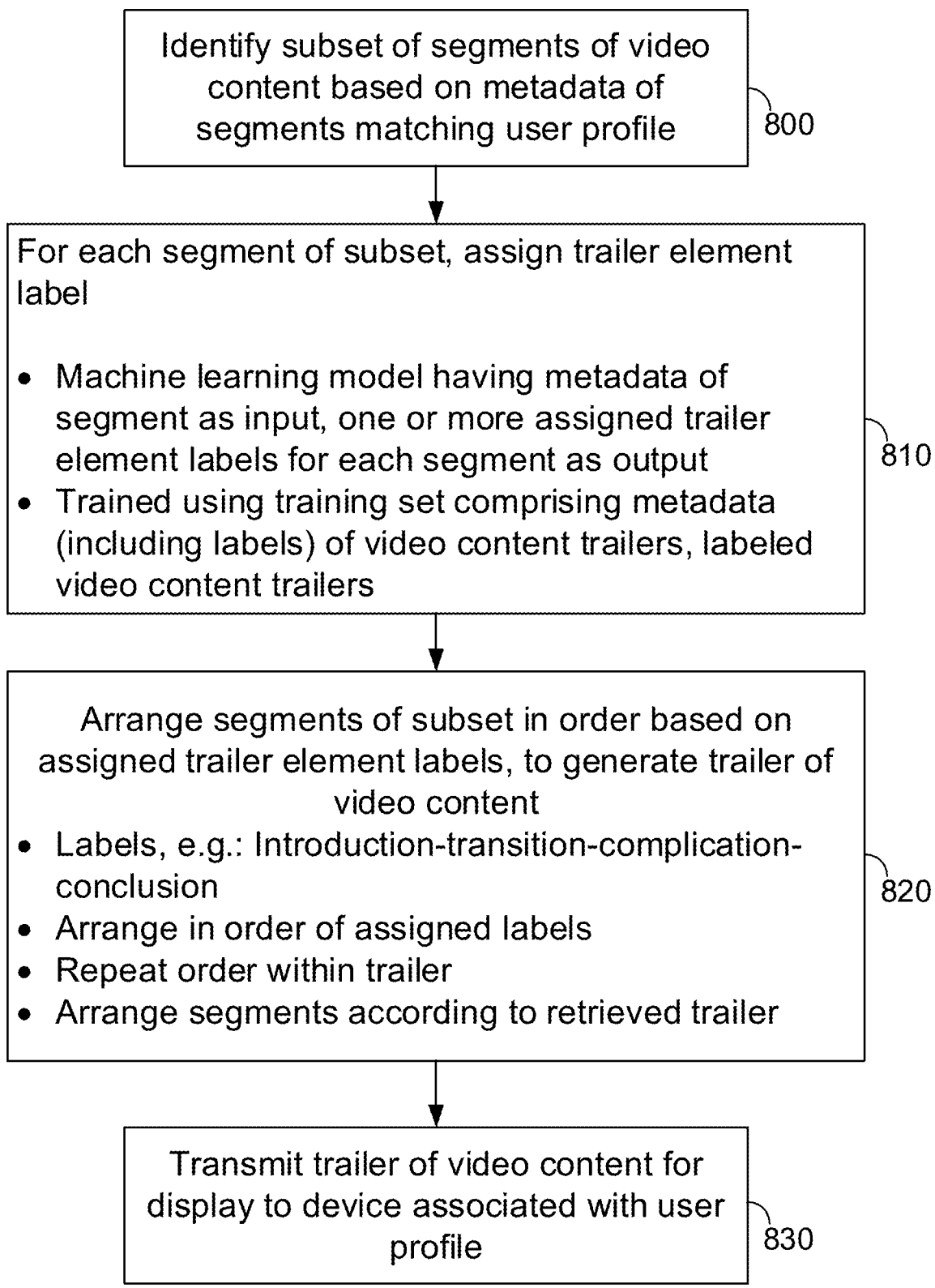
FIG. 8 is a flowchart illustrating processing steps for generating personalized video trailers, in accordance with embodiments of the disclosure.

FIG. 8 is a flowchart illustrating processing steps for generating personalized video trailers, in accordance with embodiments of the disclosure. Here, segments Seg n of content 140 may be input to selection model 160, which identifies a subset of these input segments based on metadata of segments matching a user profile (Step 800). As above, selection model 160 may retrieve a profile 422 of the intended user from a memory, and compare preferences of the profile to metadata of the segments Seg n, with segments selected according to common elements between segment metadata and user preferences.

Each segment of the selected subset is then assigned a trailer element label (step 810). As above, segments selected by selection model 160 are input to labeling model 170, which identifies its plot element and assigns a metadata label to each segment describing its identified plot element. As above, labeling model 170 may determine the plot element of a segment in any manner. In one embodiment of the disclosure, a machine learning model such as model 660 may determine audio such as characteristic phrases occurring within a segment, and plot elements may be determined from characteristic phrases along with other metadata input attributes such as the time a segment occurs within content, character identities, estimated emotions, and the like. For example, a questioning phrase such as "Who are you?" along with a first appearance of a new character in a middle portion of content may indicate a plot complication such as the introduction of a new villain. Model 660 may be trained using a training set that comprises video content trailers and their associated metadata, where the metadata contains a plot element label as well as various input attributes such as the segment metadata shown as inputs of FIG. 6B.

Labeled segments may then be selected, and arranged in order, based on their assigned trailer element labels, to generate a trailer of video content (Step 820). More specifically, as above, trailer assembly model 180 may assemble a trailer using segments arranged in a plot element order listed in a template. This template may be a predetermined template of plot elements ordered in a specified manner, or may be retrieved from an existing trailer. This trailer may have its plot elements labeled by segment, or alternatively the trailer may be segmented and labeled using models 150 and 170 of embodiments of the disclosure. Templates may recite any order of plot elements, with the recited order repeating plot elements or plot element sequences, to generate trailers of varying lengths and emotional impact as desired. Segments are arranged in the plot element order specified by the template, to generate a personalized trailer. Existing trailers may be selected in any manner. As one example, predetermined trailers may be selected at random. As another example, trailers may be selected according to their popularity level, or according to whether or how often playing them has led a user to order that movie in the past. That is, more popular, or more effective, trailers may be weighted more heavily in trailer selection. In some embodiments, trailers that were stopped, followed by the user quickly ordering the movie, may be weighted even more heavily, as they may indicate trailers that are particularly effective in prompting users to order movies.

Once this personalized trailer is generated, it may be transmitted for display to the device 200 associated with the user profile used in its construction (Step 830). Users may thus view personalized trailers created on demand for them on an individual basis.

Figure 9:
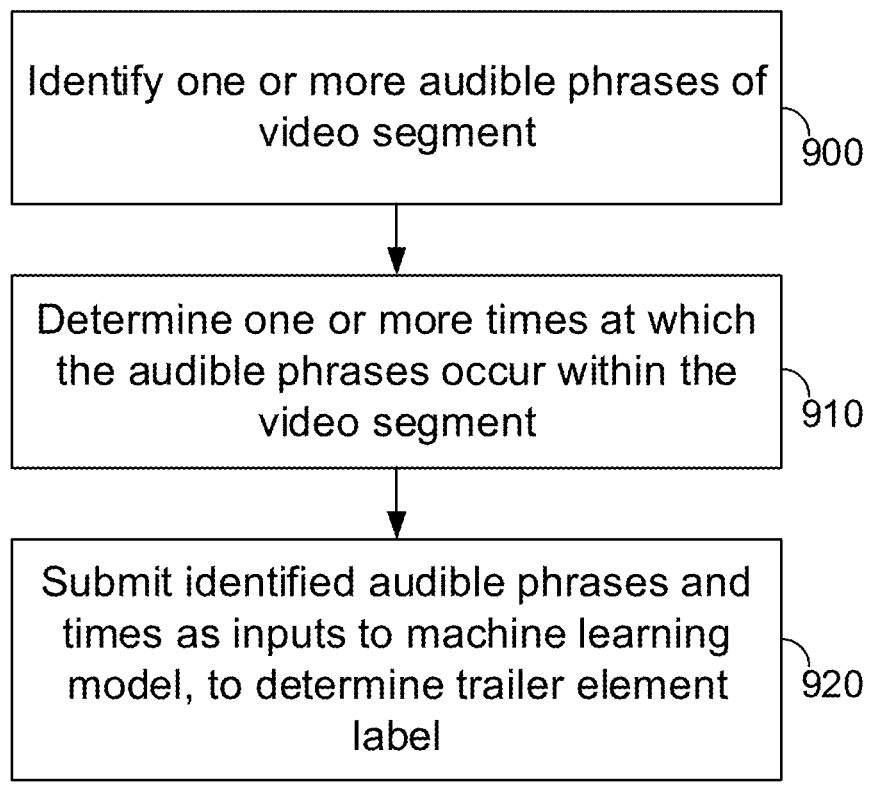
FIG. 9 is a flowchart illustrating further details of processing steps for performing plot element labeling of content segments, in accordance with embodiments of the disclosure.

FIG. 9 is a flowchart illustrating further details of processing steps for performing plot element labeling of content segments, in accordance with embodiments of the disclosure. As above, segment labeling model 418 may identify one or more audible phrases of its input video segment (Step 900). Model 418 may also determine times at which these audible phrases occur within the video segment (Step 910).

Figure 10:
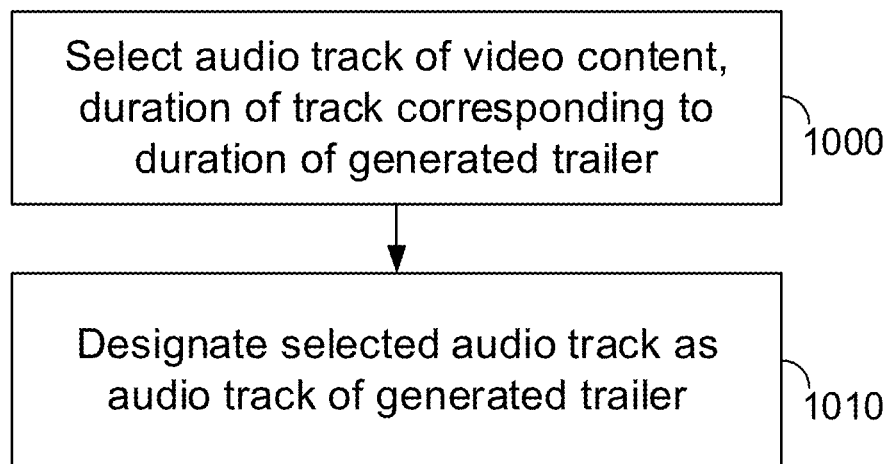
FIG. 10 is a flowchart illustrating processing steps for generating audio tracks accompanying personalized video trailers, in accordance with embodiments of the disclosure.

This indicates the point within the content at which the phrase occurs. The audible phrases and times may then be input to a model that determines a corresponding trailer element label (Step 920). As above, a model 660 or portion thereof may be trained to determine plot elements from characteristic phrases and associated metadata attributes. As another example, a rule set may specify plot elements for certain phrases or variants occurring at certain times within content, where phrases such as "Once upon a time" occurring in early portions of content may indicate an introduction segment. The model may alternatively comprise a machine learning model trained to correlate phrases and times with specific plot elements. Such a model may be, for example, a convolutional neural network or generative adversarial network trained using training sets comprising various characteristic phrases and associated attribute sets (time, character identities, voices, and the like) labeled with corresponding plot elements. Such models may thus be trained to output plot elements corresponding to input phrases and times. Alternatively, embodiments of the disclosure In some embodiments of the disclosure, it may be desirable to provide a personalized trailer that contains an audio track. FIG. 10 is a flowchart illustrating processing steps for generating audio tracks accompanying personalized video trailers, in accordance with embodiments of the disclosure. In an exemplary process, an audio track of video content may be selected from, for example, database 240. This track may be selected according to its duration. More specifically, tracks may be selected such that the duration of the selected track corresponds to the duration of the generated personal trailer (Step 1000). That is, an audio track of the same or similar length may be selected to accompany the trailer generated by embodiments of the disclosure. This audio track may then be designated as the audio track of the generated trailer (Step 1010), such as by associating the audio track with the generated personalized trailer in a database, appending it to the trailer as metadata or as another data structure, or in any other suitable manner. Audio tracks suitable for generated trailers may thus be selected, so that they fit the length or duration of their trailer.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, video segments may be determined in any manner, such as by machine learning model, heuristic, rule set, or via any other suitable mechanism. Similarly, plot element labels may be determined for segments in any manner, such as by machine learning model, heuristic, rule set, or any other suitable manner. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A computer-implemented method, comprising:
identifying a subset of segments of video content having attributes that match attributes of a user profile;
for each respective segment of the identified subset of segments, assigning a plot element label to the respective segment, wherein each plot element label corresponds to a plot element of a plurality of plot elements of the video content, and wherein the assigning comprises:
identifying, for each respective segment, an object type of an object that appears within the respective segment;
determining, for each respective segment, a timepoint associated with the respective segment in relation to a total runtime of the video content; and
determining the plot element label based at least in part on a relationship between the identified object type of the object and the determined timepoint in relation to the total runtime of the video content;
generating a trailer of the video content by arranging the segments of the subset of segments in order based on their respective assigned plot element labels; and
transmitting the trailer of the video content for display to a device associated with the user profile.

2. The method of claim 1, wherein the assigning further comprises:
training a machine learning model to accept as input the object of each respective segment and output the plot element label for each respective segment.

3. The method of claim 2,
wherein the machine learning model is trained using a training set that comprises attributes of a plurality of video content trailers, the attributes of the plurality of video content trailers having respective corresponding plot element labels.

4. The method of claim 2, wherein the assigning further comprises:
identifying one or more audible phrases of each respective segment;
determining one or more times at which the audible phrases occur within the video content; and
submitting the identified audible phrases and the times as inputs of the machine learning model, to determine the plot element label.

5. The method of claim 2, wherein the machine learning model comprises one or more of a convolutional neural network or a generative adversarial network.

6. The method of claim 1, wherein the assigning further comprises:
training a machine learning model to accept as input attributes of each respective segment and output identifications of the type of the object.

7. The method of claim 1, wherein each plot element label comprises one of (a) an introduction, (b) a transition, (c) a complication, or (d) a conclusion.

8. The method of claim 7, wherein the arranging further comprises arranging the segments in order of their assigned plot element labels (a)— (d).

9. The method of claim 8, wherein the arranging further comprises arranging a first set of the segments in the order of their assigned plot element labels (a)-(d), and arranging a second set of the segments in the order, to generate the trailer having the first set of the segments followed by the second set of the segments.

10. The method of claim 1, wherein:

the trailer of the video content is a first trailer of the video content; and the arranging further comprises:

retrieving a second trailer from a database, the second trailer being different from the first trailer;

determining a template for an order of segments that matches an order of segments in the second trailer; and arranging the segments of the first trailer according to the template for the order of segments.

11. A computer-implemented system, comprising:

computer memory;

control circuitry configured to:

identify a subset of segments of video content having attributes that match attributes of a user profile, wherein the attributes of the user profile are stored in the computer memory;

for each respective segment of the identified subset of segments, assign a plot element label to the respective segment, wherein each plot element label corresponds to a plot element of a plurality of plot elements of the video content, and wherein the assigning comprises;

identify, for each respective segment, an object type of an object that appears within the respective segment;

determine, for each respective segment, a timepoint associated with the respective segment in relation to a total runtime of the video content; and determine the plot element label based at least in part on a relationship between the identified object type of the object and the determined timepoint in relation to the total runtime of the video content;

generate a trailer of the video content by arranging the segments of the subset of segments in order based on their respective assigned plot element labels; and transmit the trailer of the video content for display to a device associated with the user profile.

12. The system of claim 11, wherein the control circuitry is further configured to assign the plot element label to the respective segment by:

training a machine learning model to accept as input the object of each respective segment and output the plot element label for each respective segment.

13. The system of claim 12, wherein the control circuitry is further configured to train the machine learning model using a training set that comprises attributes of a plurality of video content trailers, the attributes of the plurality of video content trailers having respective corresponding plot element labels.

14. The system of claim 12, wherein the control circuitry is further configured to assign the plot element label to the respective segment by:

identifying one or more audible phrases of each respective segment;

determining one or more times at which the audible phrases occur within the video content; and submitting the identified audible phrases and the times as inputs of the machine learning model, to determine the plot element label.

15. The system of claim 12, wherein the machine learning model comprises one or more of a convolutional neural network or a generative adversarial network.

16. The system of claim 11, wherein the control circuitry is further configured to assign the plot element label to the respective segment by:

training a machine learning model to accept as input attributes of each respective segment and output identifications of the type of the object.

17. The system of claim 11, wherein each plot element label comprises one of (a) an introduction, (b) a transition, (c) a complication, or (d) a conclusion.

18. The system of claim 17, wherein the control circuitry is further configured to arrange the segments of the subset of segments by arranging the segments in order of their assigned plot element labels (a)-(d).

19. The system of claim 18, wherein the control circuitry is further configured to arrange the segments of the subset of segments by arranging a first set of the segments in the order of their assigned plot element labels (a)-(d), and arranging a second set of the segments in the order, to generate the trailer having the first set of the segments followed by the second set of the segments.

20. The system of claim 11, wherein:

the trailer of the video content is a first trailer of the video content; and the control circuitry is further configured to:

arrange the segments of the subset of segments by retrieving a second trailer from a database, the second trailer being different from the first trailer;

determine a template for an order of segments that matches an order of segments in the second trailer; and arrange the segments of the first trailer according to the template for the order of segments.

* * * * *